United States Patent [19]

Yamashina

[11] Patent Number: 5,436,685
[45] Date of Patent: Jul. 25, 1995

[54] LENS-FITTED PHOTOGRAPHIC FILM UNIT WHOSE PARTS CAN BE RECYCLED EASILY

[75] Inventor: Yasuhiro Yamashina, Tokyo, Japan

[73] Assignee: Fuji Photo Film Co., Ltd., Kanagawa, Japan

[21] Appl. No.: 203,556

[22] Filed: Mar. 1, 1994

Related U.S. Application Data

[63] Continuation of Ser. No. 913,435, Jul. 15, 1992, abandoned.

[30] Foreign Application Priority Data

Jul. 15, 1991 [JP] Japan .................. 3-200050

[51] Int. Cl.⁶ .................. G03B 15/03; G03B 17/00
[52] U.S. Cl. .................. 354/202; 354/288; 354/149.11
[58] Field of Search .................. 354/75, 76, 202, 204, 354/206, 217, 266, 288, 149.11

[56] References Cited

U.S. PATENT DOCUMENTS

| | | | |
|---|---|---|---|
| 3,603,232 | 9/1971 | Jones | 354/212 |
| 4,884,087 | 11/1989 | Mochida et al. | 354/75 |
| 4,972,649 | 11/1990 | Mochida et al. | 354/288 X |
| 5,005,035 | 4/1991 | Pagano | 354/206 |
| 5,021,811 | 6/1991 | Maurimus et al. | 354/76 |
| 5,126,775 | 6/1992 | Nakai et al. | 354/288 |
| 5,146,255 | 9/1992 | Nakai et al. | 354/288 |
| 5,170,199 | 12/1992 | Nakai et al. | 354/288 X |

FOREIGN PATENT DOCUMENTS

| | | |
|---|---|---|
| 3-39734 | 2/1991 | Japan . |
| 1368952 | 10/1974 | United Kingdom . |
| 1462353 | 1/1977 | United Kingdom . |

*Primary Examiner*—Michael L. Gellner
*Assistant Examiner*—J. K. Han
*Attorney, Agent, or Firm*—Young & Thompson

[57] ABSTRACT

A lens-fitted photographic film unit is constituted of a film containing unit, a photo-taking unit, and a front cover. The film containing unit is formed from plastic and has an exposure aperture, a film supplying chamber and a film take-up chamber. A shutter mechanism and a wind-up stopping mechanism have metallic parts and are assembled together into the photo-taking unit, so as to facilitate classification of plastic units and metal-containing units at the time of recycling. The photo-taking unit is removably secured to the front of the plastic film containing unit. In a preferred embodiment, a flash device is removably mounted on the film containing unit.

28 Claims, 6 Drawing Sheets

LENS-FITTED PHOTOGRAPHIC FILM UNIT WHOSE PARTS CAN BE RECYCLED EASILY

This application is a continuation of application Ser. No. 07/913,435, filed Jul. 15, 1992, now abandoned.

BACKGROUND OF THE INVENTION

1. Field of the Invention

The present invention relates to a lens-fitted photographic film unit, and more particularly to a photographic film unit of which an incorporated component is easily removed when the film unit is disassembled.

2. Description Related to the Prior Art

Lens-fitted photographic film units (hereinafter referred to as film units) are now on the market, e.g. under a trademark "Quick Snap" (manufactured by Fuji Photo Film Co., Ltd.), which are a single-use camera preloaded with photographic film. These film units make it possible to take pictures whenever desired without buying or carrying an expensive and heavy camera. Because the film unit can take pictures of sufficient quality in spite of its low cost, in spite of its low cost, various types of film units have been provided and marketed.

Such a film unit is disclosed in U.S. Pat. Nos. 4,884,087 and 4,972,649 and Japanese Patent Laid-Open Publ. No. 3-39734 and has a film housing of which a front cover and a rear cover are secured to a main assembly, in which assembly a taking lens, a film wind-up wheel, a shutter mechanism and a wind-up stopping mechanism are incorporated. The wind-up stopping mechanism is adapted to prevent the wind-up wheel from rotating when the film is fed one frame per exposure by rotation of the wind-up wheel. The main assembly is loaded in a light-tight fashion with a 135-type photographic film in a cassette as defined by ISO code 1007, 1979 version.

The main assembly is provided with a film supplying chamber and a film take-up chamber formed on opposite horizontal sides of the taking lens. The unexposed film is wound in a roll and contained in the film supplying chamber. A user who has purchased the film unit winds up the film frame by frame at each exposure on a spool in a cassette contained in the film take-up chamber. The film unit in its entirety is forwarded to a photo laboratory when the whole strip of the film is exposed. An operator at the laboratory unloads the cassette containing the exposed film from the film unit and subjects it to development and printing in accordance with conventional photographic processing techniques. The user receives photoprints and a negative film but does not receive the film housing of the film unit.

The film housing after processing has heretofore been destroyed and discarded as waste. But there is damage to the environment caused thereby, so that it is desirable to be able to recycle the film housing after processing. There could be two ways of recycling the film housing: to reassemble reusable parts as withdrawn, or to remold and regenerate moldable parts. The main assembly is usually free from dirt or damage because it is protected by the front and rear covers. It would therefore be highly advantageous, if possible, to save and reuse the main assembly incorporating the taking lens, the shutter mechanism, and the wind-up stopping mechanism.

It is disclosed in Japanese Patent Laid-Open Publ. No. 3-39734 to construct a lens-fitted film unit by following the steps of: constructing a wind-up stopping mechanism including a metallic spring together with a film containing unit of plastic integrally having the film supplying chamber for containing a roll of unexposed film and the film take-up chamber for receiving the film as wound up after exposure; combining with the film containing unit a shutter mechanism as assembled previously in a separate manner; engaging the front cover with the film containing unit to bear against the wind-up stopping mechanism and the shutter mechanism; loading the film containing unit with the film; and then securing the rear cover tightly thereto. Perhaps it would be conceivable to utilize this structure of the film unit for recycling its parts.

The film unit of this prior document is, however, disadvantageous for recycling parts, because discarding such parts will be less costly than recycling them. Although the front cover, rear cover, shutter mechanism and film containing unit can be disassembled easily, it is laborious to remove the wind-up stopping mechanism from the film containing unit and to separate and classify its parts into resin and metal. If the film containing unit is reused without removing the wind-up stopping mechanism, the reuse of the shutter mechanism as withdrawn necessitates an inspection of its performance after securing it to the film containing unit as reused. A random combination of a reused shutter mechanism and a reused film containing unit causes additional errors in dimensions, which might influence badly the performance of the recycled film unit, e.g. the shutter speed.

OBJECTS OF THE INVENTION

In view of the foregoing problems, an object of the present invention is to provide a lens-fitted photographic film unit of which the parts can be recycled easily.

Another object of the present invention is to provide a lens-fitted photographic film of which the parts can be classified easily into those to be remolded and those to be reused.

Still another object of the present invention is to provide a lens-fitted photographic film of which the performance is not worsened even when parts as reused are reassembled into it.

SUMMARY OF THE INVENTION

In order to achieve the above and other objects and advantages of this invention, a film containing unit is provided which has an exposure aperture, a film supplying chamber and a film take-up chamber formed therein. A photo-taking unit is associated with a shutter mechanism and a wind-up stopping mechanism and is secured to the film containing unit so removably as to facilitate removal of non-resinous parts. A front cover is secured to the film containing unit in front of the photo-taking unit.

In a preferred embodiment, a flash device is removably secured to the film containing unit and includes a circuit board, a flash emitting unit secured thereto, and a synchro switch.

In accordance with the present invention, the parts constituting the novel film unit can be recycled easily. Recycling the parts of the novel lens-fitted film unit will be much less costly than discarding them. Besides the front cover, rear cover, and film containing unit being easily disassembled, it is easy to remove the photo-taking unit from the film containing unit, thereby to classify easily its parts into all resinous remoldable units and metal-containing units. Even though the reuse of the shutter mechanism of the photo-taking unit as withdrawn necessitates an inspection of its performance after securing it to the film containing unit as reused, a random combination of a reused photo-taking unit and a reused film containing unit will give rise to no error, e.g. in dimensions, and thus will have no bad influence on the performance of the recycled film unit, e.g. as to the shutter speed. The performance will not be worsened even when the parts as reused are reassembled into the novel film unit.

BRIEF DESCRIPTION OF THE DRAWINGS

The above and other objects and advantages of the present invention will become more apparent from the following detailed description when read in connection with the accompanying drawings, in which.

DETAILED DESCRIPTION OF THE PREFERRED EMBODIMENTS

Figure 1:
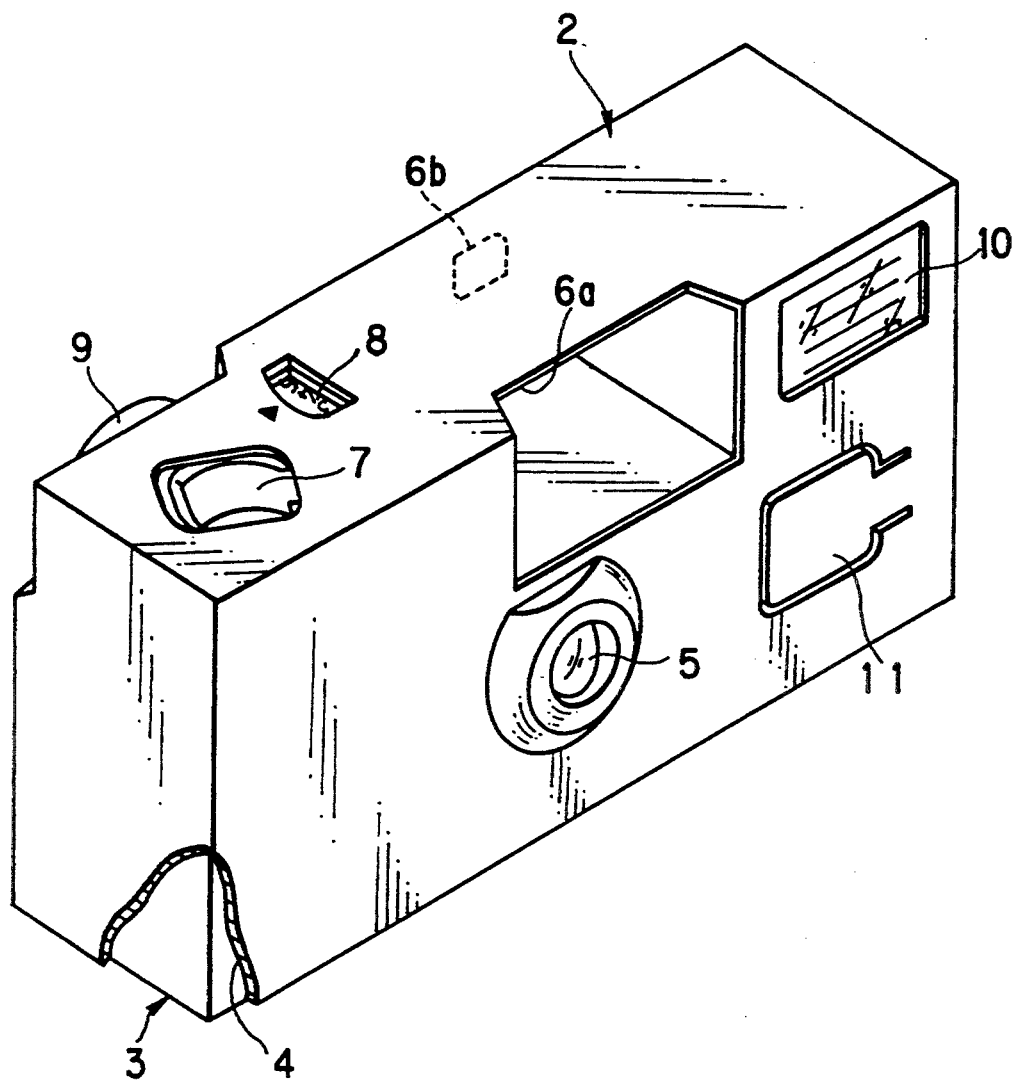
FIG. 1 is a perspective view, partially broken away, illustrating an outer configuration of a novel lens-fitted photographic film unit.

FIGS. 1 to 5 illustrate a novel lens-fitted film unit. Referring to FIG. 1, the film unit consists of a film housing 3 having a photograph-taking function and an external casing 4 containing the film housing 3. Photographs are taken with the film housing 3 contained in the external casing 4. The external casing 4 is provided so that the lens-fitted film unit has an attractive appearance, and is for example paper box with the exterior surface printed. The external casing 4 has openings for exposing a taking lens 5, a finder front opening 6a, a finder rear opening 6b, a shutter release button 7, a frame counter 8, a film wind-up wheel 9 and a flash emitting unit 10 containing a flash tube, and a tab 11 that can be pushed to operate a flash pushbutton 19 (see FIG. 3) which is resiliently depressible in a front cover 21. The external casing 4 may be formed of a plastic sheet instead of a paper box.

Figure 2:
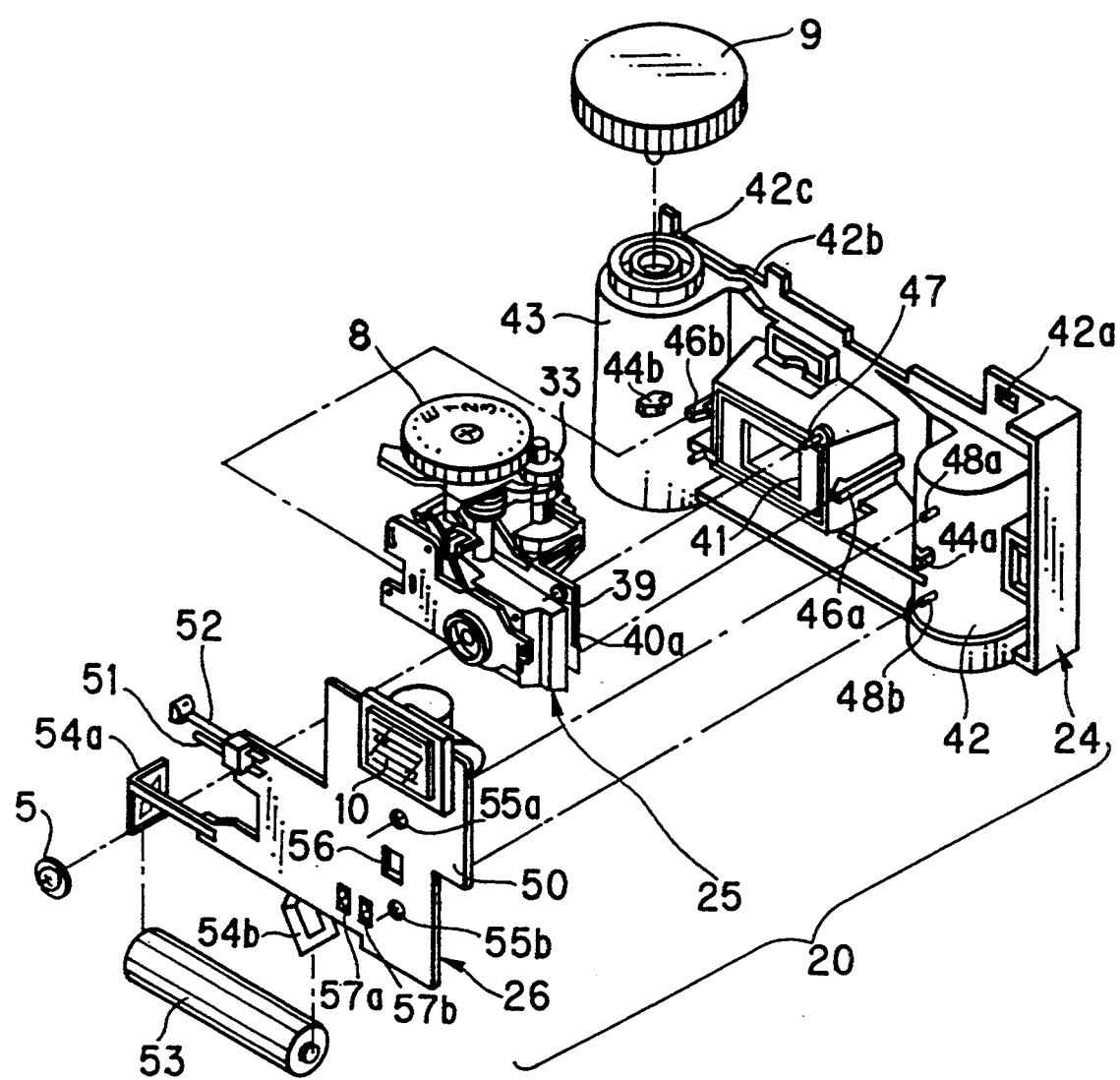
FIG. 2 is an exploded perspective view illustrating a main assembly of the novel film unit.
Figure 3:
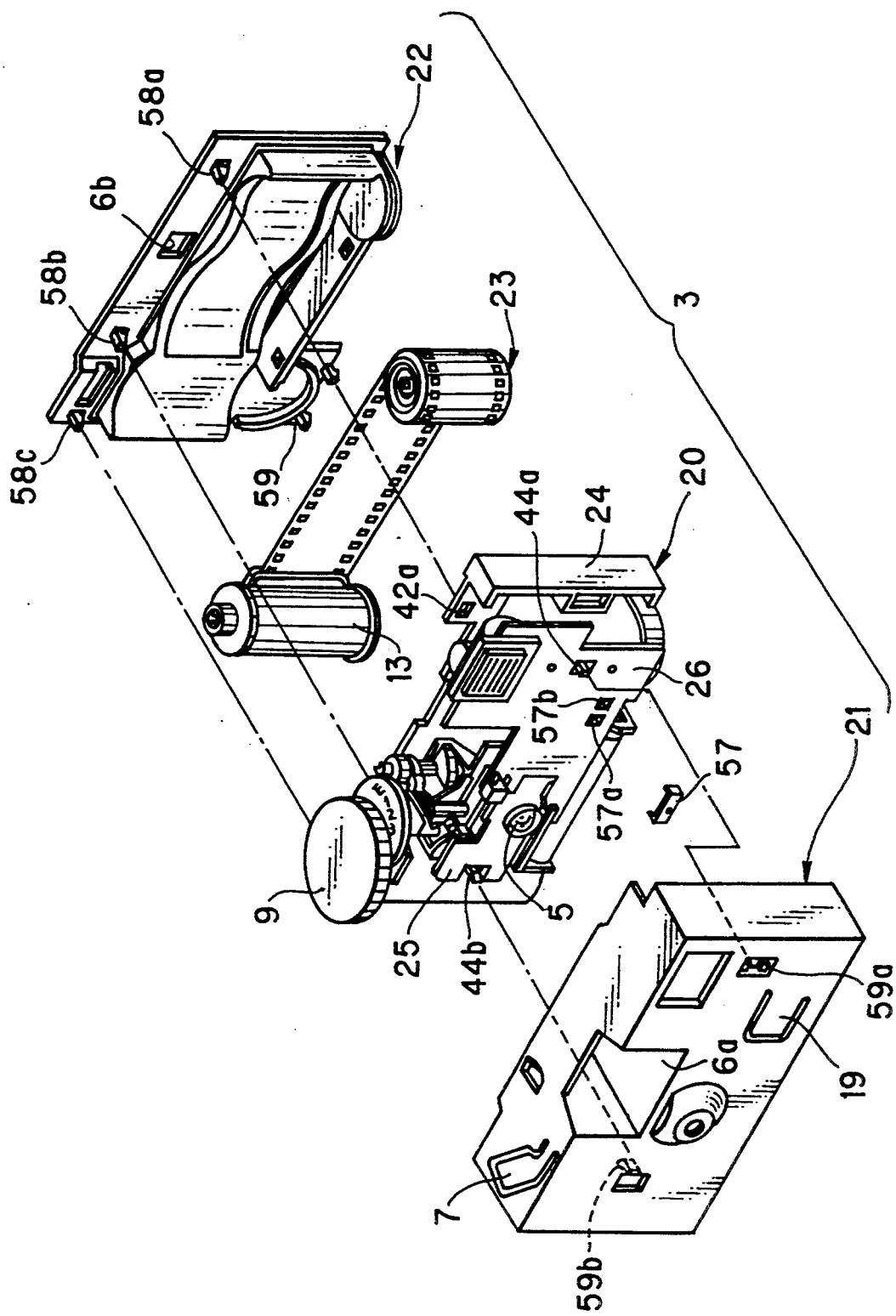
FIG. 3 is an exploded perspective view illustrating a film housing of the novel film unit.

As illustrated in FIGS. 2 and 3, the film housing 2 includes a main assembly 20, the front cover 21 to be arranged in front thereof, and a rear cover 22 to be arranged behind the main assembly 20 after loading photographic film 23. The main assembly 20 is constituted of a film containing unit 24, a photo-taking unit 25 and an electronic flash device 26. The photo-taking unit 25 is provided with mechanisms necessary for taking a photograph, i.e. the taking lens 5, a shutter mechanism, the film wind-up wheel 9, and a wind-up stopping mechanism constituted of a ratchet lever 30 and a cam member 33 to be described later.

The film containing unit 24 is provided with a film supplying chamber 42 for containing a roll of the unexposed film 23, e.g. negative film, a film take-up chamber 43 for containing a cassette 13 of a 35 mm film cassette, and a rear light-shielding tunnel 41 having an exposure aperture 41a (see FIG. 5) formed between the two chambers 42 and 43 to define an optical path. It is to be noted that a rotatable spool (not shown) may be provided in the film supplying chamber 42, and that the roll of film 23 may be wound around it. The unexposed film 23 has been previously contained in the cassette 13 with a film trailer secured to a spool of the cassette. The film take-up chamber 43 holds the cassette 13 with a spool, whereas the film supplying chamber 42 holds a roll of the film 23 which is pulled out from the cassette 13 and wound into a roll at the factory prior to assembly of the film unit. The film wind-up wheel 9 is mounted on top of the film take-up chamber 43, such that the film 23 is wound back into the cassette 13 by counterclockwise rotation of the spool when a user operates the film wind-up wheel 9, frame by frame as photography proceeds.

On the film containing unit 24 are formed claws 44a and 44b for securing the front cover 21, coupling portions 42a, 42b and 42c for securing the rear cover 22, a projection 47 for positioning the hole 39 in the photo-taking unit 25, and resiliently deformable claws 46a and 46b on lateral sides of the rear light-shielding tunnel 41 adapted to be coupled with recesses 40a and 40b, respectively. On the front of the film supplying chamber 42 are formed projections 48a and 48b for positioning the flash device 26.

The flash device 26 has a printed circuit board or flash base plate 50, on which are fixed the flash emitting unit 10, a pair of contact segments 51 and 52 of an X contact well-known in the art, and a pair of electrode terminals 54a and 54b constituting a holder for resiliently securing between them a battery 53. In the circuit board 50 are formed holes 55a and 55b for receiving the projections 48a and 48b, and an opening 56 for allowing insertion of the coupling claw 44a. A metal switching segment 57 is secured to the front cover 21 behind the flash button 19 and in front of the circuit board 50. On the front of the circuit board 50 are disposed a pair of stationary contacts 57a and 57b, which are short-circuited by the switching segment 57 to constitute a charge switch, which is adapted to charge the flash device 26 while the flash button 19 of the front cover 21 is depressed.

The flash device 26 and the photo-taking unit 25 are assembled with the film containing unit 24 into the main assembly 20, which is loaded with the film 23 and with the cassette 13, and enclosed by securing the rear cover 22. The rear cover 22 has claws 58a, 58b and 58c to be coupled with the coupling portions 42a to 42c, and a bottom lid 59 openable for removing the cassette 13 containing the exposed film 23. The rear cover 22 as a whole is a one-piece plastic molding. The front cover 21 is fitted on the front of the main assembly 20, has a pair of claws 59a and 59b to be coupled with the claws 44a and 44b and is adapted to bear firmly against the flash device 26 fixed to the film containing unit 24. The front cover 21 is provided inter alia with the release button 7, the flash button 19, and the finder front opening 6a. The front cover 21 having such features is a one-piece plastic molding.

Figure 4:
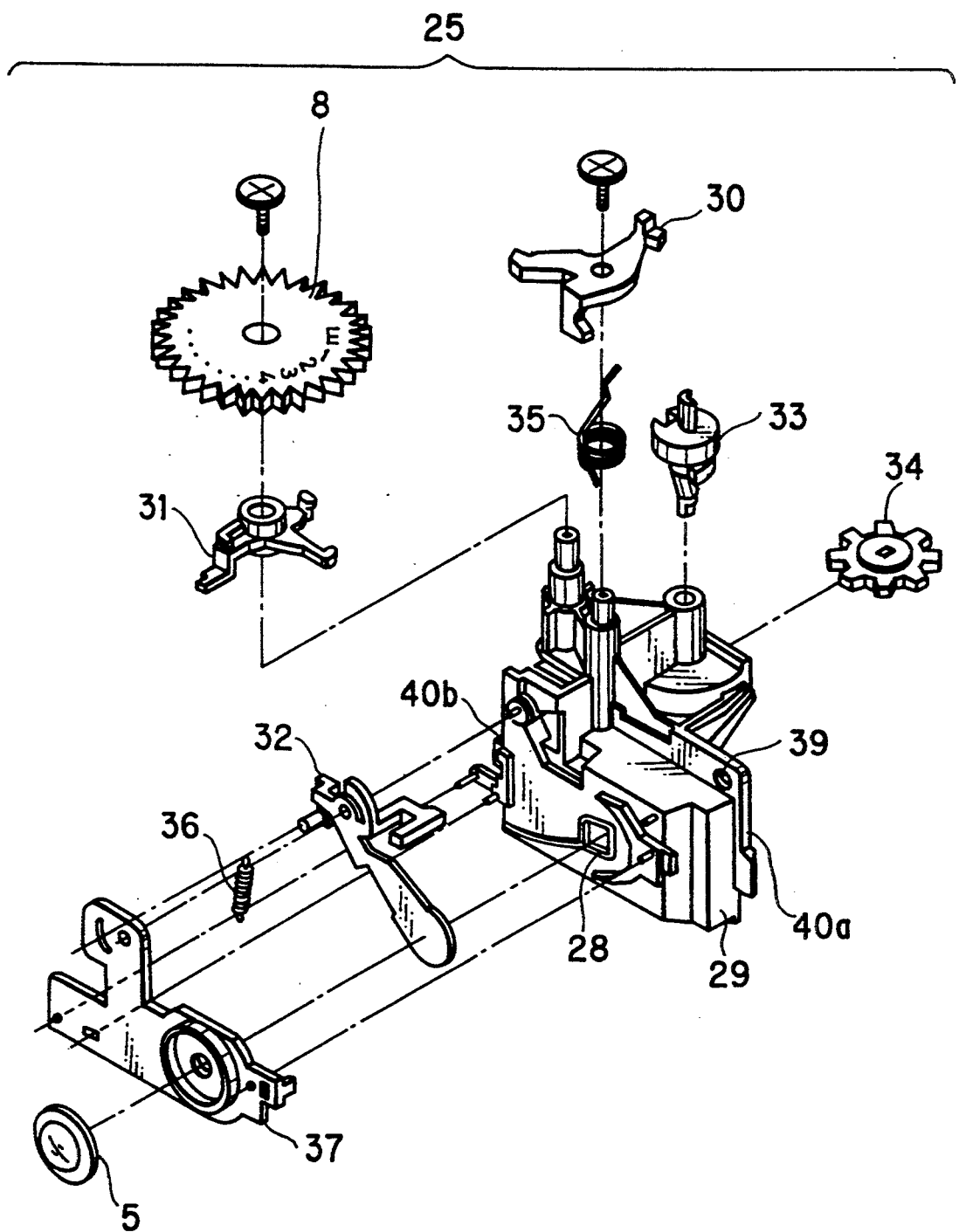
FIG. 4 is an exploded perspective view illustrating a photo-taking unit incorporated in the novel film unit.
Figure 5:
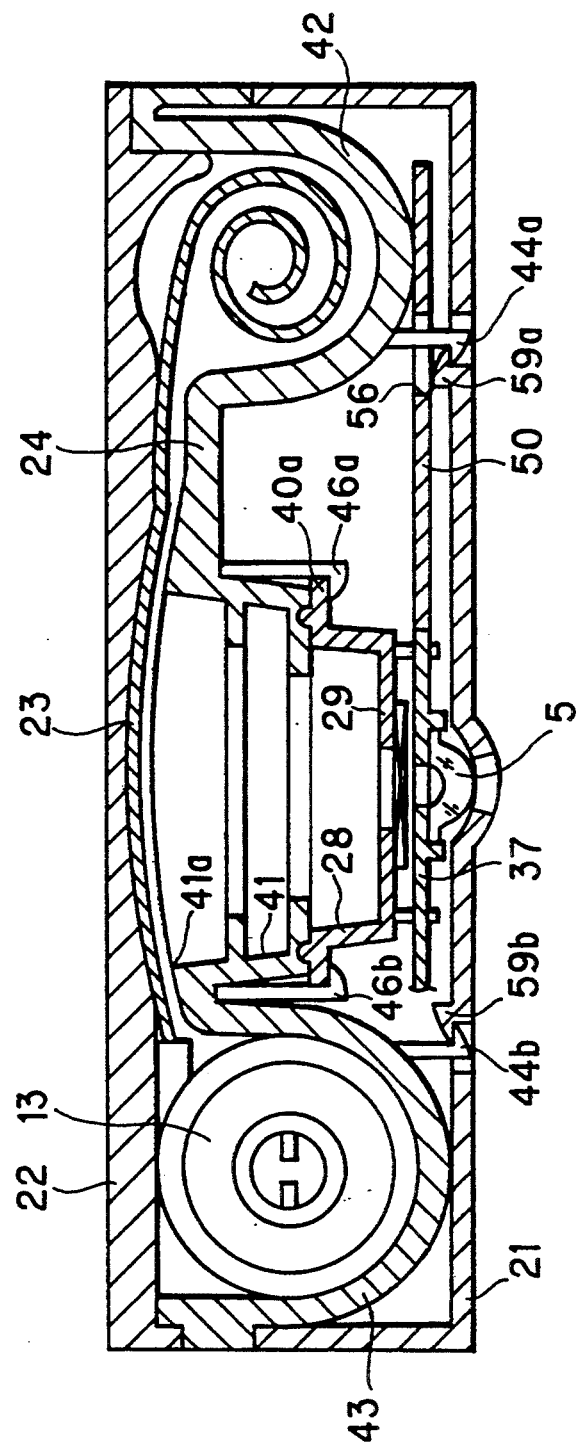
FIG. 5 is a horizontal section illustrating the novel film unit.

The details of the photo-taking unit 25 are shown in FIGS. 4 and 5. A front light-shielding tunnel 28 forming the optical path is formed in a base member 29 of the photo-taking unit. When the photo-taking unit 25 is secured to the film containing unit 24, the front tunnel 28 communicates with the rear tunnel 41 to transmit the light from the taking lens 5 therethrough onto an image-forming plane wherein the film 23 lies.

On the base member 29 are assembled the taking lens 5, the shutter mechanism, the wind-up stopping mechanism, and a counter mechanism, of which the parts are the same as those disclosed in U.S. Pat. Nos. 4,884,087 and 4,972,649 and so will be only briefly described herein. The shutter mechanism, the wind-up stopping mechanism and the counter mechanism are constituted of a shutter actuating lever 31, the frame counter 8, a cam 33, a driven sprocket wheel 34, a ratchet lever 30, a shutter blade 32 and springs 35 and 36, of which the ratchet lever 30, the shutter blade 32 and the springs 35 and 36 are metallic. The ratchet lever 30 and the shutter blade 32 may each be a plastic molding, or they may be metallic.

As is well known in the art, the release button 7 when depressed disengages the shutter actuating lever 31 from the ratchet lever 30, and causes the shutter actuating lever 31 to hit the shutter blade 32 by the bias of the spring 35. When the wind-up wheel 9 in FIG. 2 is rotated, the spool of the cassette 13 is rotated to wind up the film 23 thereabout. Winding up of the film 23 rotates the driven sprocket wheel 34 in turn to rotate the cam 33, which causes the ratchet lever 30 to return the shutter actuating lever 31 to its initial position and to rotate the frame counter 8 an amount corresponding to one frame. When the film 23 is wound up or fed by one frame, a recess in the cam member 33 causes the ratchet lever 30 to rotate counterclockwise. A distal ratchet of the ratchet lever 30 is engaged with a tooth of the wind-up wheel 9 to stop the wind-up wheel 9 from rotating.

The base member 29 has the hole 39 for positioning the photo-taking unit 25 on the film containing unit 24, and has the recesses 40a and 40b one horizontally opposite sides of the front tunnel 28. The base member 29 is a one-piece plastic molding. The ratchet lever 30, the shutter actuating lever 31, the frame counter 8, the cam 33, the driven sprocket wheel 34 and the spring 35 are secured via screws to the base member 29, on the front face of which the shutter blade 32 and the spring 36 are mounted. These latter are covered by a lens plate 37 having an opening for a stop. The lens plate 37 is formed from plastic, in the front of which the taking lens 5 of transparent plastic is mounted in a removable manner.

A process of disassembling the film unit 2 when returned to the manufacturer via a photo laboratory will be next described. In a first step, the external casing 4 is removed from the film unit 2. If the external casing 4 is a paper box, it may be recycled. In a second step, the front cover 21 is removed from the film housing 3 by deforming the claws 59a and 59b so that they disengage from the claws 44a and 44b of the film containing unit 24. The wind-up wheel 9 is removed at the same step. In a third step, the taking lens 5 and the flash device 26 are removed. The taking lens 5 is easily dismounted as it is removable from the lens plate 37 of the photo-taking unit 25. The flash unit 26 is easily removed from the film containing unit 42 via the projections 48a and 48b, and is subjected to an inspection and then forwarded to a reassembling process. In a fourth step, the photo-taking unit 25 is removed from the film containing unit 24, while deforming the claws 46a and 46b as engaged with the recessed 40a and 40b in the photo-taking unit 25. Because the photo-taking unit 25 as removed is free from any damage, it is sent to the reassembling process after inspection. The film-containing unit 24 with the rear cover 22 coupled thereto is all resin after the cassette 13 has been removed in the photo laboratory with the film 23 as exposed, and so it can be sent to a process of recycling the resin.

Should a claw like the claws 46a and 46b or a projection like the projection 47, be formed on the side of the photo-taking unit 25, it might be so damaged during disassembly that the unit could not be recycled. But the claws 46a and 46b being flexible and those claws and the projection 47 being formed on the film containing unit 24, the resin of the film containing unit 24 can be regenerated even despite small damage thereto. The front cover 21, the taking lens 5 and the wind-up wheel 9 are also subjected to the resin regenerating process.

The reassembling process of the film unit 2 will now be described. The photo-taking unit 25 as disassembled and inspected is secured to the film containing unit 24. The positioning projection 47 is so fitted in the positioning hole 39 as to position the photo-taking unit 25 on the film containing unit 24. The claws 46a and 46b are easily engaged with the recesses 40a and 40b to secure the photo-taking unit 25 reliably to the unit 24.

After securing the film containing unit 24 to the photo-taking unit 25, the flash device 26 as disassembled and inspected is mounted thereon and covered with the front cover 21. The main assembly 20 with the front cover 21 as reassembled is reloaded with the unexposed film 23 and the cassette 13 in a darkroom, the assembly is enclosed by securing thereto the rear cover 22, and the unit thus reproduced is covered with a new external casing 4 to obtain once more a film unit 2 as illustrated in FIG. 1.

Although the photo-taking unit 25 according to the present invention is secured to the film containing unit 24 via engagement between the claws 46a, 46b and recesses 40a, 40b, the claw 46a and the recess 40a may be omitted. The claw 46b and the recess 40b only may couple the photo-taking unit 25 to the film containing unit 24, in addition to which a positioning structure or a fitting structure may be supplied on the side where the claw 46a and the recess 40a would otherwise be provided.

Figure 6:
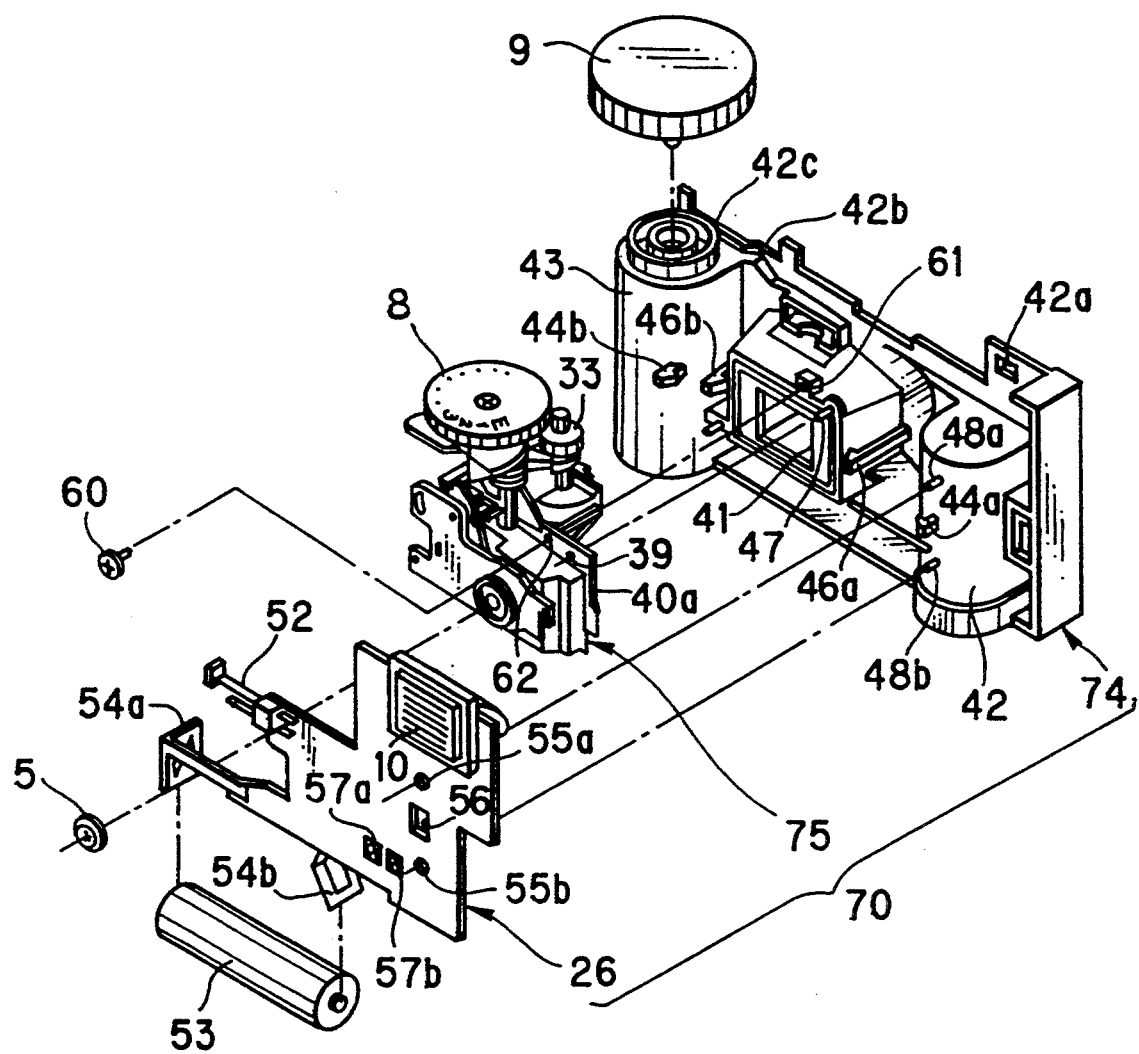
FIG. 6 is an exploded perspective view illustrating a preferred embodiment of the present invention in which a photo-taking unit is fixed via a screw onto a film containing unit.

Turning now to FIG. 6, it will be seen that a photo-taking unit 75 may be fixed to a film containing unit 74 by a screw 60 passing rather loosely through a passage hole 62, in which reference numeral 70 designates the main assembly. For the screw 60, a receiving hole 61 should be formed in the film containing unit 74. If the screw 60 is a blind screw, the hole 61 has a previously tapped internal thread. If the screw 60 is a tapping screw, the hole 61 is of a simple shape. Forming the hole 61 in the film containing unit 74 can make it possible to remove the photo-taking unit 75 without damage. Even when the inner edge of the hole 61 is worn away until it is too loose, no problem will arise from a standpoint of recycling.

It is to be noted that, although the illustrated embodiments are provided with a flash device 26, the present invention is also applicable to a film unit lacking any flash device. For this construction, the claw 44a is adapted to have fixed engagement with the claw 59a even without passing through hole 56 through the circuit board 50.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A lens-fitted photographic film unit which has resinous and metal parts and which has an exposure aperture, a film supplying chamber for containing unexposed photographic film, and a film take-up chamber for taking up said film after exposure, in which said film supplying chamber and said film take-up chamber are disposed horizontally on opposite sides of said exposure aperture, and which has a taking lens, a shutter mechanism, a film wind-up wheel for winding up said film as exposed, and a wind-up stopping mechanism for preventing said wind-up wheel from rotating after film is fed by one frame after each exposure by rotation of said wind-up wheel, said film unit comprising:
   a resinous film containing unit in which said exposure aperture, said film supplying chamber and said film take-up chamber are formed;
   a single photo-forming unit including said shutter mechanism and said wind-up stopping mechanism, said single photo-forming unit having metal parts and being secured to said film containing unit but being removable as a single unit from said film containing unit so as to facilitate removal of metal parts from resinous parts; and
   a front cover secured to said film containing unit in front of said photo-taking unit.

2. A lens-fitted film unit as defined in claim 1, wherein said photo-taking unit further includes a counter mechanism for indicating a number designating a frame.

3. A lens-fitted film unit as defined in claim 1, further comprising a rear cover secured to a rear of said film containing unit as loaded with said unexposed film so as to cover a rear of said exposure aperture and said film supplying chamber and said film wind-up chamber in light-tight fashion.

4. A lens-fitted film unit as defined in claim 1, wherein said film take-up chamber contains a cassette having a rotatable spool to which one end of said film is connected, and said film supplying chamber contains said unexposed film wound in a form of a roll.

5. A lens-fitted film unit as defined in claim 1, wherein said photo-taking unit includes metallic parts, and said film containing unit is a one-piece resinous molding.

6. A lens-fitted film unit as defined in claim 1, further comprising a flash device removably secured to said film containing unit and including a circuit board, a flash emitting unit secured to said circuit board, and a synchro switch.

7. A lens-fitted film unit as defined in claim 6, wherein said synchro switch is a pair of elongated metal contact segments extending side by side from a surface of said circuit board, one distal end of each of said contact segments functioning as an X contact which causes a synchro signal for allowing said flash device to emit a flash when said X contact is switched on responsive to an operation of said shutter mechanism.

8. A lens-fitted film unit as defined in claim 6, wherein:
   a charge switch is associated with said flash device for charging said flash device, and includes a pair of contacts provided on a front of said circuit board, and a switching segment having ends adapted to come into contact with said contacts so as to short-circuit said contacts; and
   a resiliently depressible pushbutton defined by a channel-shaped slot formed in said front cover, and adapted to cause said switching segment to short-circuit said pair of said contacts when depressed.

9. A lens-fitted film unit as defined in claim 6, wherein said circuit board further includes a pair of electrode terminals in electrical contact with a battery, said battery being disposed between said film supplying chamber and said film take-up chamber under said photo-taking unit and extending in a horizontal direction.

10. A lens-fitted film unit as defined in claim 1, wherein:
   a rear light-shielding tunnel is formed in said film containing unit for passing light from said taking lens to said exposure aperture; and
   said photo-taking unit has a base member for supporting a shutter blade of said shutter mechanism, which base member has a front light-shielding tunnel communicating with said rear tunnel for transmitting light to said exposure aperture.

11. A lens-fitted film unit as defined in claim 10, wherein said base member is a one-piece resinous molding.

12. A lens-fitted film unit as defined in claim 10, wherein:
   at least one engaging recess is formed in said photo-taking unit; and
   at least one deformable first claw is provided on said film containing unit for engagement with said engaging recess so as to secure said photo-taking unit to said film containing unit.

13. A lens-fitted film unit as defined in claim 12, wherein said shutter mechanism further includes an actuating lever for moving said shutter blade, a first metallic spring for biasing said actuating lever in a direction toward an open state, and a second metallic spring for biasing said shutter blade in a direction toward a closed state.

14. A lens-fitted film unit as defined in claim 12, wherein said engaging recess is formed in said base member.

15. A lens-fitted film unit as defined in claim 14, wherein said first claw is disposed beside said rear tunnel.

16. A lens-fitted film unit as defined in claim 12, wherein a lens plate is secured to a front of said base member for supporting said taking lens and adapted to cover said shutter blade.

17. A lens-fitted film unit as defined in claim 12, wherein said rear cover is substantially L-shaped, and includes a first portion for shielding from light a rear of said film supplying chamber, said film take-up chamber and said rear tunnel, and a second portion for shielding from light a bottom of said film supplying chamber and said film take-up chamber.

18. A lens-fitted film unit as defined in claim 17, wherein:
   at least one second claw is formed on a top of said first portion; and
   at least one engaging portion is formed behind said film containing unit for being engaged with said second claw so as to secure said rear cover to said film containing unit.

19. A lens-fitted film unit as defined in claim 18, wherein:
   at least one third claw is formed behind said front cover; and
   at least one fourth claw is formed on a front of said film containing unit for being coupled with said third claw so as to secure said front cover to said film containing unit.

20. A lens-fitted film unit as defined in claim 19, wherein said fourth claw is disposed on a front of said film supplying chamber and film wind-up chamber.

21. A lens-fitted film unit as defined in claim 19, further comprising a flash unit removably secured to said film containing unit, and wherein:
 a passage opening is formed in said flash device and adapted to receive said third claw when said third and fourth claws are coupled together; and
 said flash device is secured between said front cover and said film containing unit removably by coupling said third and fourth claws.

22. A lens-fitted film unit as defined in claim 17, wherein said second portion of said rear cover is so openable under said film supplying chamber as to facilitate removal of a cassette from said film take-up chamber.

23. A lens-fitted film unit as defined in claim 1, further comprising means associated with said film containing unit and said photo-taking unit for positioning said photo-taking unit relative to said film containing unit when said photo-taking unit is secured thereto.

24. A lens-fitted film unit as defined in claim 23, wherein said positioning means includes a positioning projection provided on said film containing unit, and a positioning hole formed in said photo-taking unit for receiving said positioning projection.

25. A lens-fitted film unit as defined in claim 24, further comprising a flash unit removably secured to said film containing unit, and wherein at least one second positioning projection is formed on a front of said film containing unit, and at least one second positioning hole is formed in said flash device for receiving said second positioning projection so as to position said flash device relative to said film containing unit.

26. A lens-fitted film unit as defined in claim 1, wherein:
 a receiving hole is formed in said film containing unit; and
 a passage hole is formed in said photo-taking unit, a screw extending through said passage hole into said receiving hole so as to secure said photo-taking unit fixedly but removably to said film containing unit.

27. A lens-fitted film unit as defined in claim 1, wherein said taking lens is fixedly supported between said photo-taking unit and said front cover.

28. A lens-fitted photographic film unit which has resinous and metal parts and which has an exposure aperture, a film supplying chamber for containing unexposed photographic film, and a film take-up chamber for taking up said film after exposure, in which said film supplying chamber and said film take-up chamber are disposed horizontally on opposite sides of said exposure aperture, and which has a taking lens, a shutter blade, a driven sprocket wheel driven in rotation by movement of said film, shutter cocking means for cocking said shutter blade in response to rotation of said sprocket wheel, shutter driving means for driving said shutter blade upon release of said shutter cocking means, a film wind-up wheel for winding up exposed film into said take-up chamber, and a wind-up stopping mechanism for preventing said wind-up wheel from rotating after said film is wound up by one frame after each exposure by rotation of said wind-up wheel, said film unit comprising:
 a resinous film containing unit in which said exposure aperture, said film supplying chamber and said film take-up chamber are formed;
 a single photo-forming unit including said shutter blade, said sprocket wheel, said shutter cocking means, said shutter driving means, and said wind-up stopping mechanism, said single photo-forming unit having metal parts and being secured to said film containing unit but being removable as a single unit from said film containing unit so as to facilitate removal of metal parts from resinous parts; and
 a front cover secured to said film containing unit in front of said photo-forming unit.

* * * * *